June 6, 1933.                S. STONBERG                1,912,602
                      FLOATING OPAL AND THE LIKE
                          Filed May 5, 1932

INVENTOR,
Samuel Stonberg,
BY
J. Stuart Freeman
ATTORNEY.

Patented June 6, 1933

1,912,602

UNITED STATES PATENT OFFICE

SAMUEL STONBERG, OF PHILADELPHIA, PENNSYLVANIA

FLOATING OPAL AND THE LIKE

Application filed May 5, 1932. Serial No. 609,396.

The object of the invention is to provide improvements in jewelry, and particularly in what might well be termed a synthetic quasi gem, adapted for use in rings, ear pendants, necklaces, and the like.

Another object is to provide an article of this nature which comprises the combination of a transparent hollow body, containing a liquid of such specific gravity for a given gem, that the gem also within said body is held in suspension and does not settle to the bottom of the hollow body, said liquid instead of being transparent being somewhat translucent, in order to prevent the otherwise clear definition of the outlines of the gem particles, without substantially hindering the visibility of both reflected and refracted light rays.

Still another object is to provide a modified form of the device in which two or more types of gem elements are used in a liquid of given specific gravity, whereby one set of such elements tends slightly to rise towards the surface of the liquid following agitation, while a second set remains in suspension as in the construction first described. In a case of this sort the different sets of elements may be differently colored, so as to provide a composite effect when agitated and thereafter providing a stratified effect, when permitted to separate in accordance with the relation of their respective specific gravities to that of the surrounding liquid.

Figure 1:
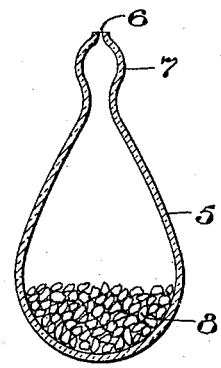
Figure 2:
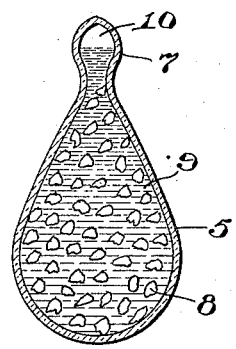
Figure 3:
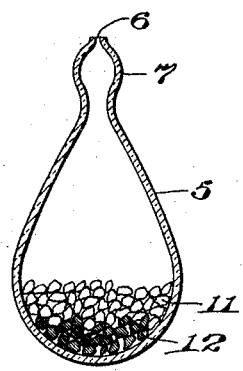
Figure 4:
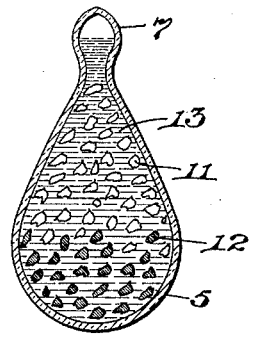

With these and other objects in mind, the invention comprises further details of construction and operation, which are fully brought out in the following description, when read in conjunction with the accompanying drawings, in which Fig. 1 is a vertical diametrical sectional view of a hollow transparent body in which numerous gem elements have been inserted; Fig. 2 is a similar view after the insertion of the liquid into the body and the sealing of the latter; Fig. 3 is a sectional view similar to Fig. 1 but containing a plurality of gem elements of different specific gravity and color; and Fig. 4 is a sectional view of the same similar to Fig. 2, with the body sealed after being substantially filled with the proper liquid.

Referring to Fig. 1, a hollow transparent or other diaphanous body member 5 is shown as being of suitable shape and provided with a sealing-off aperture 6, adjacent to which a radially enlarged expansion chamber 7 is provided, before the constriction of said aperture there having been inserted into said member a quantity of gem elements 8, such as opal chips or the like. Suitable slightly translucent liquid 9 is then injected into said body member by any well-known means and the aperture 6 sealed by fusing or otherwise, the upper surface of the liquid being at such height within or adjacent to said expansion chamber as to provide a space 10, (Fig. 2) the air or other gas in which expands or contracts with differences in the temperature of the composite article, and thus prevents the same from breaking due to this cause. An excellent liquid for this use consists of s-tetrabromoethane diluted with organic solvent miscible therewith, such for instance as carbon tetrachloride, in order to obtain the exact specific gravity desired. In this form of the article, with the specific gravity of the liquid carefully adjusted so as to be equal to or but very slightly greater than that of the gem elements, the latter will remain in practically evenly distributed suspension about the interior of the body, and tending to float rather than sink or settle after a time, their natural drift towards one another at times, due to capillary attraction, being of such slight nature as to offer no hindrance to their re-separation and distribution upon again being agitated.

Referring now to Fig. 3, a similar transparent hollow body 5 is provided with an expansion chamber 7 adjacent to a seal-off aperture 6, after the insertion into said body of two or more different sets of gem elements 11 and 12. A liquid 13 is also injected into said body member and the aperture sealed as shown in Fig. 4. In this case, as hereinbefore referred to, the relative specific gravities of the liquid and the gem sets is such that following agitation the latter tend to separate, one rising gradually towards the top of the liquid, while the other remains in suspension or rises less speedily.

It may well be imagined that many novel effects can be obtained by assembling in an article of this character brilliantly color gem elements, to all intents and purposes suspended in a slightly translucent liquid within a transparent hollow body member.

Having thus described my invention, what I claim and desire to protect by Letters Patent of the United States is:—

1. The combination of a hollow diaphanous body member, a plurality of gem elements therein, and a quantity of s-tetrabromoethane surrounding said elements and diluted sufficiently to provide a specific gravity substantially equal to that of said elements.

2. The combination of a hollow diaphanous body member, a plurality of gem elements therein, and a quantity of s-tetrabromoethane surrounding said elements and diluted sufficiently with carbon tetrachloride or other organic solvent to provide a specific gravity substantially equal to that of said elements.

3. The combination of a hollow diaphanous body member, a plurality of gem elements therein, and a liquid in the member containing said elements having the properties essentially of s-tetrabromoethane of a specific gravity relatively close to that of the gem elements.

4. The combination of a closed diaphanous body member, a plurality of gem elements therein, a liquid in the member in which said elements move to and from suspended and floating positions, said liquid being like s-tetrabromoethane, particularly stable and non-crystallizable and unaffected chemically by said elements diluted with carbon tetrachloride so as to be of a specific gravity slightly greater than that of the gem elements.

5. The combination of a hollow diaphanous body member, a liquid therein, a plurality of gem elements in the liquid, the specific gravities of the elements and the liquid being relatively close, and a plurality of gem elements in the liquid of slightly less specific gravity than that of the first mentioned elements and liquid so that the second mentioned elements from a position in suspension in the liquid will have a rising movement relatively to the first mentioned elements.

In testimony whereof I have affixed my signature.

SAMUEL STONBERG.